United States Patent
Shigemasa et al.

(10) Patent No.: US 7,145,960 B2
(45) Date of Patent: Dec. 5, 2006

(54) TRANSMITTER APPARATUS AND COMMUNICATION SYSTEM EMPLOYING THE SAME

(75) Inventors: Haruhiko Shigemasa, Yamatokouriyama (JP); Yoshihiro Nakao, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 777 days.

(21) Appl. No.: 10/289,325

(22) Filed: Nov. 7, 2002

(65) Prior Publication Data

US 2003/0123567 A1 Jul. 3, 2003

(30) Foreign Application Priority Data

Dec. 27, 2001 (JP) ............................ 2001-396151

(51) Int. Cl.
*H04L 27/04* (2006.01)
(52) U.S. Cl. ..................... 375/295; 375/369; 370/506
(58) Field of Classification Search ............... 375/295, 375/363, 369, 354, 362; 370/503, 511, 512, 370/513, 514, 464, 498, 506, 509; 342/42, 342/43, 51
See application file for complete search history.

(56) References Cited

U.S. PATENT DOCUMENTS

| | | | |
|---|---|---|---|
| 4,926,182 A * | 5/1990 | Ohta et al. ..................... 342/44 |
| 5,245,346 A * | 9/1993 | Nishimura et al. ........... 342/42 |
| 5,331,450 A * | 7/1994 | Heep et al. .................... 398/92 |
| 5,504,475 A | 4/1996 | Houdou et al. |
| 5,606,313 A * | 2/1997 | Allen et al. ............... 340/10.31 |
| 6,112,055 A | 8/2000 | Bennett et al. |
| 6,198,913 B1 | 3/2001 | Sung et al. |
| 6,452,980 B1 * | 9/2002 | Zalud et al. ................. 375/285 |
| 6,593,845 B1 * | 7/2003 | Friedman et al. ......... 340/10.33 |
| 6,760,578 B1 * | 7/2004 | Rotzoll ..................... 455/343.2 |

FOREIGN PATENT DOCUMENTS

| EP | 0 317 007 A1 | 5/1989 |
|---|---|---|
| EP | 0 447 278 A2 | 9/1991 |
| WO | WO 01/91046 | 11/2001 |

\* cited by examiner

*Primary Examiner*—Pankaj Kumar
*Assistant Examiner*—Naheed Ejaz
(74) *Attorney, Agent, or Firm*—Harness, Dickey & Pierce, P.L.C.

(57) ABSTRACT

A transmitter apparatus has a modulator for modulating a carrier wave to produce a modulated wave having communication data superimposed thereon and a transmitter for transmitting the modulated wave to a receiver apparatus. Before starting communication, the transmitter apparatus transmits a predetermined dummy pulse to the receiver apparatus so as to bring the communication data restored by demodulation in the receiver apparatus into a logic state in which the communication data should be kept when no communication is taking place. This makes it possible to perform correct communication even if the communication data demodulated in the receiver apparatus before the start of communication is not kept in the logic state in which it should be kept when no communication is taking place.

6 Claims, 5 Drawing Sheets

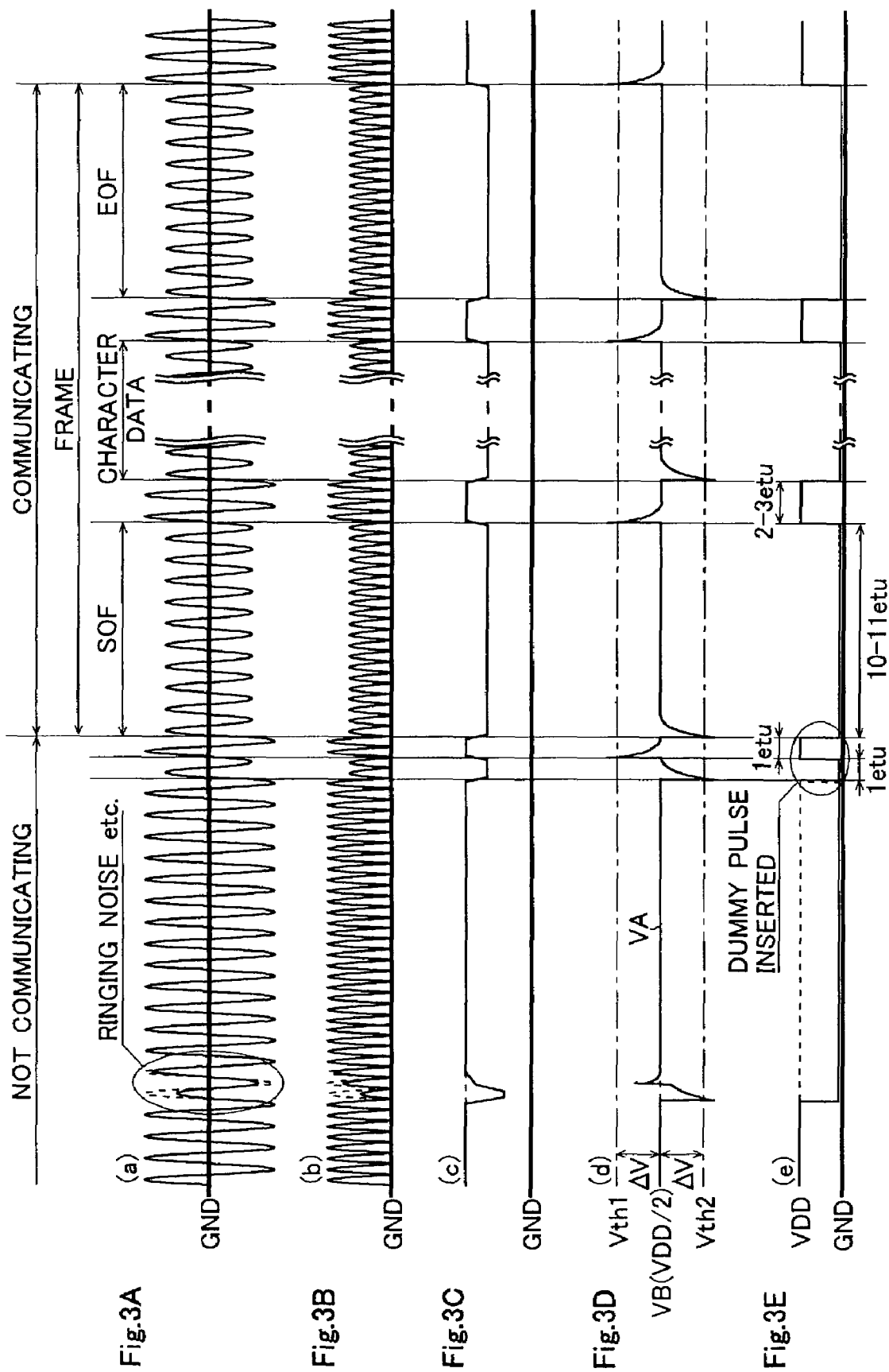

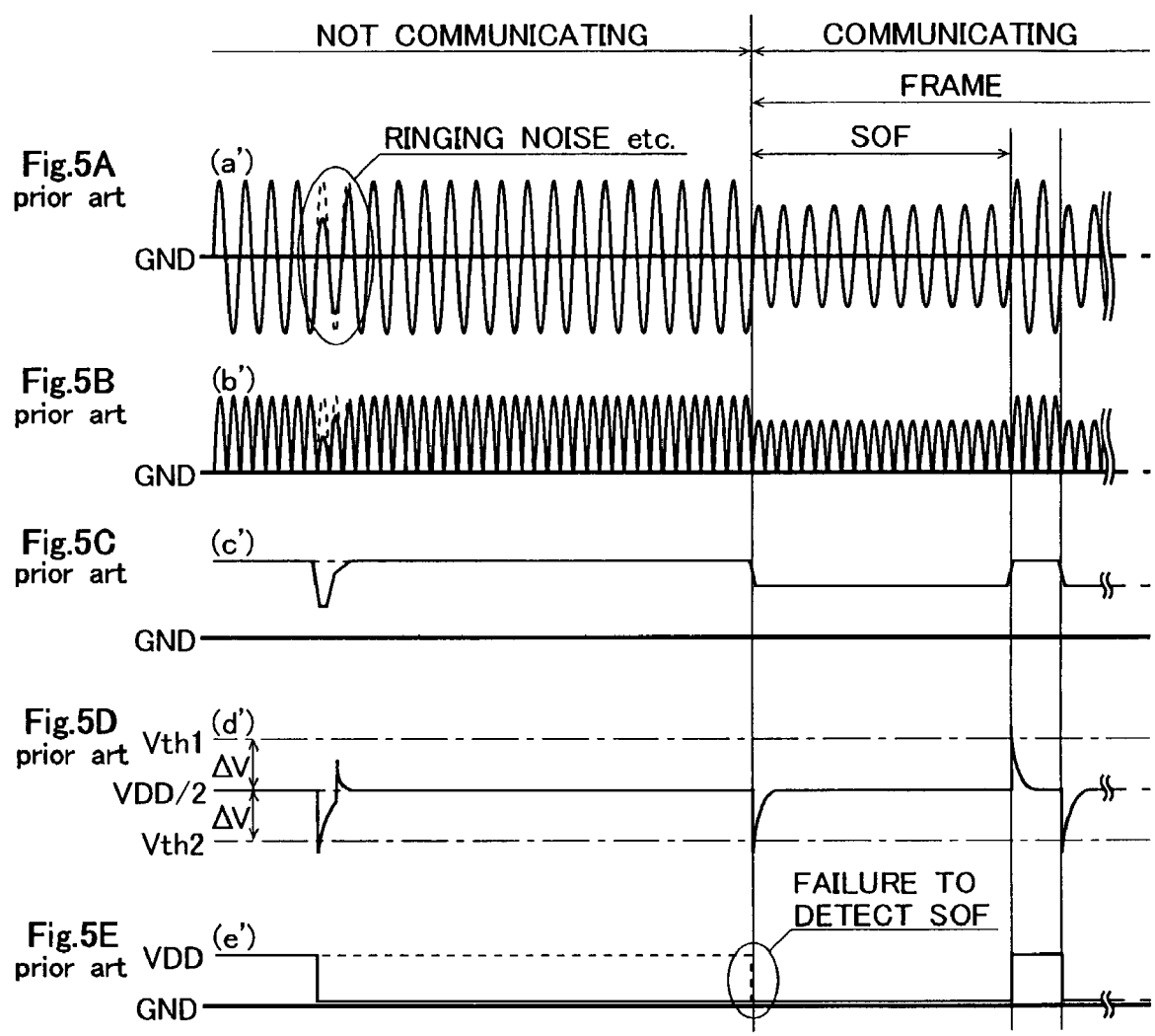

TRANSMITTER APPARATUS AND COMMUNICATION SYSTEM EMPLOYING THE SAME

BACKGROUND OF THE INVENTION

1. Field of the Invention

The present invention relates to a transmitter apparatus that modulates a carrier wave to produce a modulated wave having communication data superimposed thereon and that then transmits the modulated wave to a receiver apparatus. The present invention relates also to a communication system employing such a transmitter apparatus.

2. Description of the Prior Art

In recent years, IC cards having a semiconductor integrated circuit device mounted on a card base have been becoming increasingly popular. IC cards can perform data communication between the semiconductor integrated circuit device mounted thereon and an external reader/writer apparatus, and can store necessary data in a non-volatile memory incorporated in the semiconductor integrated circuit device mounted thereon.

In particular, multiple-purpose IC cards provided with a large-capacity memory so as to be able to store a plurality of application programs can serve multiple purposes as cannot be served by conventional magnetic cards or the like, and therefore such IC cards are adopted in information communication systems in a variety of fields (such as the finance, distribution, transportation, and medical industries).

One main advantage of a non-contact-type IC card system as described above is that there is no need to provide contact terminals in reader/writer apparatuses or IC cards. This reduces the occurrence of faults, such as breakage of contacts, and thus helps reduce maintenance costs and enhance usability.

Another main advantage of a non-contact-type IC card system is that it permits the building of a transaction processing system that is easier and quicker to operate than one based on a contact-type system. For example, when a non-contact-type IC card system is adopted in a ticket examination system for a railway or bus network, it is possible to examine a ticket easily and quickly by asking a passenger to hold the ticket (an IC card) over or around a ticket examination gate (a reader/writer apparatus) (this operation will hereinafter be referred to as "holding-over" operation) or put the ticket into momentary contact with the ticket examination gate (this operation will hereinafter be referred to as "touch-and-go" operation).

Incidentally, non-contact-type IC card systems are classified, according to the distance over which communication takes place, into close, near, and other types. For each of these types, the format to be used in data communication is currently in the process of being standardized under ISO/IEC14443 and ISO/IEC15693.

FIGS. 4A and 4B are waveform diagrams illustrating the data communication format complying with the ISO/IEC14443 standard. FIG. 4A shows a demodulated waveform observed in an IC card or reader/writer apparatus, and FIG. 4B shows an outline of character data communicated.

As shown in FIG. 4A, the data communication format complying with the ISO/IEC14443 standard is designed to permit frame-by-frame communication of information, in which each frame consists of an SOF [start of frame] indicating the head of the frame, followed by character data complying with a predetermined character transmission format, followed by an EOF [end of frame] indicating the end of the frame. Here, as shown in FIG. 4B, the character transmission format is designed to permit continuous communication of data corresponding to as many sets of one-byte data as the number of characters to be communicated, with each byte having a start bit and a stop bit added thereto. In this data communication format, when no communication is taking place, the communication data is kept in a predetermined logic state (hereinafter referred to as a mark state), and meanwhile the receiver apparatus remains in a state waiting for data communication.

It is true that, in the data communication format described above, the receiver apparatus can recognize the start of data communication by detecting a transition of the received data from a mark state (a logic "H") to a fall due to an SOF (a logic "L").

However, in the data communication format described above, if the communication data is not kept in a mark state (at a logic "H") when no communication is taking place, it is not possible to detect an SOF. This leads to failure in data communication.

FIGS. 5A to 5E are waveform diagrams illustrating erroneous detection of an SOF. In a transmitter apparatus complying with the ISO/IEC14443 Type B standard, a carrier wave (having a carrier frequency of 13.56 MHz) is subjected to 10% amplitude modulation (hereinafter referred to as 10% ASK (amplitude shift keying)) to produce a modulated wave (a') having communication data superimposed thereon, and this modulated wave (a') is transmitted to the receiver apparatus. It is to be noted that, in 10% ASK, when a carrier wave is modulated, its amplitude is reduced to about 90% of its original amplitude in the unmodulated state.

In the receiver apparatus, the modulated wave (a') is subjected to full-wave rectification to obtain a rectified wave (b'), which is then integrated to produce an envelope wave (c'). The envelope wave (c') is then differentiated to obtain a differentiated wave (d'), which is then compared with threshold levels Vth1 and Vth2 (VDD/2±ΔV) to produce a binary demodulated wave (e') representing the communication data. That is, in the receiver apparatus, slight fluctuations in the rectified wave (b') are detected to produce the demodulated wave (e').

Here, if, as indicated by broken lines in these figures, the demodulated wave (e') is kept in a mark state (at a logic "H") when no communication is taking place, the receiver apparatus can recognize the start of data communication by detecting a transition of the demodulated wave (e') from a mark state (a logic "H") to the fall due to an SOF (a logic "L").

On the other hand, if, as indicated by solid lines in the figures, ringing noise or the like is superimposed on the modulated wave (a') when no communication is taking place, a distortion appears in the rectified wave (b') and in the envelope wave (c'). This causes an unintended noise pulse to appear in the differentiated wave (d').

Even then, so long as the lower peak of the noise pulse does not reach below the threshold level Vth2 or its upper peak reaches above the threshold level Vth1, once the noise pulse disappears, the demodulated wave (e') is kept back in a mark state (at a logic "H"). Thus, no erroneous detection of an SOF results.

However, if, as shown in the figures, the lower peak of the noise pulse reaches below the threshold level Vth2 and in addition its upper peak does not reach above the threshold level Vth1, an unintended transition from a mark state (a logic "H") to a logic "L" occurs in the demodulated wave (e'), which is thereafter kept in the latter logic state even after the disappearance of the noise pulse. With the demodulated wave (e') kept at a logic "L" in this way when no communication is taking place, it is impossible to detect the falling edge of an SOF. This results in failure in communication.

In particular, in low-depth modulation (modulation in which the ratio of the maximum amplitude to the minimum amplitude of the modulated wave (a') is comparatively low) such as 10% ASK, the slightest noise can be erroneously recognized as data. This makes the above-described failure more likely.

Moreover, since non-contact-type IC cards are supplied with electric power by way of a radio wave, their modulation/demodulation operation tends to be unstable because of fluctuations in the electric power they receive. This makes quite likely failure similar to that described above.

SUMMARY OF THE INVENTION

An object of the present invention is to provide a transmitter apparatus that can perform correct data communication even if the communication data restored by demodulation in a receiver apparatus before the start of data communication is not kept in a logic state in which the communication data should be kept when no communication is taking place. Another object of the present invention is to provide a communication system employing such a transmitter apparatus.

To achieve the above object, according to the present invention, a transmitter apparatus is provided with: a modulator for modulating a carrier wave to produce a modulated wave having communication data superimposed thereon; and a transmitter for transmitting the modulated wave to a receiver apparatus. Here, before starting communication, the transmitter apparatus transmits a predetermined dummy pulse to the receiver apparatus so as to bring communication data restored by demodulation in the receiver apparatus into a logic state in which the communication data should be kept when no communication is taking place.

BRIEF DESCRIPTION OF THE DRAWINGS

This and other objects and features of the present invention will become clear from the following description, taken in conjunction with the preferred embodiments with reference to the accompanying drawings in which:

FIGS. 3A to 3E are waveform diagrams illustrating how erroneous detection of an EOF is avoided;

FIGS. 5A to 5E are waveform diagrams illustrating erroneous detection of an SOF.

DESCRIPTION OF THE PREFERRED EMBODIMENTS

Figure 1:
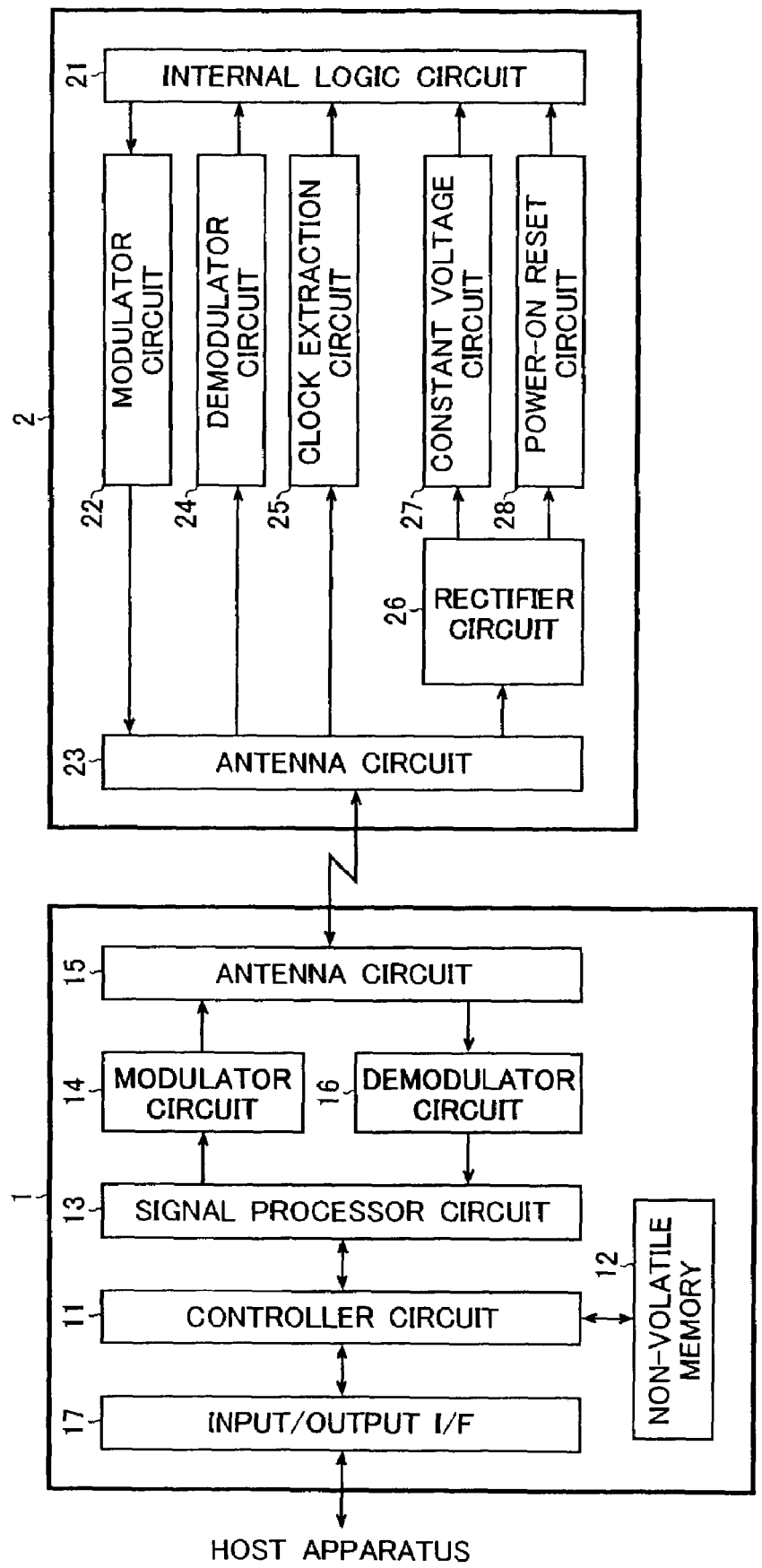
FIG. 1 is a block diagram of a non-contact-type IC card system embodying the invention.

FIG. 1 is a block diagram of a non-contact-type IC card system embodying the invention. The non-contact-type IC card system of this embodiment includes a reader/writer apparatus 1 and a non-contact-type IC card 2, and is configured as a non-contact-type communication system that uses the data communication format complying with the ISO/IEC14443 standard to achieve data communication and power feeding between them.

As shown in FIG. 1, the reader/writer apparatus 1 includes a controller circuit 11, a non-volatile memory 12, a signal processor circuit 13, a modulator circuit 14, an antenna circuit 15, a demodulator circuit 16, and an input/output interface circuit 17 (hereinafter referred to as the I/F circuit 17).

The controller circuit 11 incorporates a CPU and memories (a ROM, a RAM, and the like). The controller circuit 11 starts up by reading a program previously stored in the non-volatile memory 12, and operates to control the individual circuit blocks of the reader/writer apparatus 1 and perform data communication with a host apparatus (such as a personal computer) through the I/F circuit 17. In the non-volatile memory 12, there are also stored various commands for controlling the IC card 2 (for example, a format command for initializing the flash memory incorporated in the internal logic circuit 21 of the IC card 2), and these commands are issued as required. The signal processor circuit 13, according to a control signal fed from the controller circuit 11, detects the IC card 2 and processes communication data communicated to and from the IC card 2.

The modulator circuit 14, according to a control signal fed from the signal processor circuit 13, subjects a carrier wave (having a carrier frequency of 13.56 MHz) to 10% ASK to produce a modulated wave having communication data superimposed thereon, and feeds the modulated wave to the antenna circuit 15. The antenna circuit 15, on one hand, transmits the modulated wave fed from the modulator circuit 14 to the IC card 2, and, on the other hand, receives a modulated wave transmitted from the IC card 2 and feeds it to the demodulator circuit 16. The demodulator circuit 16 restores communication data by demodulating the modulated wave fed thereto, and feeds the communication data to the signal processor circuit 13.

The IC card 2 incorporates a semiconductor integrated circuit device (IC chip), which includes, as shown in FIG. 1, an internal logic circuit 21, a modulator circuit 22, an antenna circuit 23, a demodulator circuit 24, a clock extraction circuit 25, a rectifier circuit 26, a constant voltage circuit 27, and a power-on reset circuit 28.

The internal logic circuit 21 incorporates a CPU and memories (a ROM, a RAM, and the like), and controls the individual circuit blocks of the IC card 2. The internal logic circuit 21 is provided with a UART (universal asynchronous receiver transmitter) for converting serial data obtained from the demodulator circuit 24 into parallel data that can be processed by the CPU.

The modulator circuit 22, according to a control signal fed from the internal logic circuit 21, subjects a carrier wave (having a carrier frequency of 13.56 MHz) to 10% ASK to produce a modulated wave having communication data superimposed thereon, and feeds the modulated wave to the antenna circuit 23. The antenna circuit 23, on one hand, transmits the modulated wave fed from the modulator circuit 22 to the reader/writer apparatus 1, and, on the other hand, receives a modulated wave transmitted from the reader/writer apparatus 1 and feeds it to the demodulator circuit 24, the clock extraction circuit 25, and the rectifier circuit 26.

The demodulator circuit 24 restores communication data by demodulating the modulated wave fed thereto, and feeds the communication data to the internal logic circuit 21. The clock extraction circuit 25 extracts from the modulated wave fed thereto a clock signal necessary for the operation of the internal logic circuit 21, and feeds the clock signal to the internal logic circuit 21.

The rectifier circuit 26 rectifies the modulated wave fed thereto to produce direct-current electric power, and feeds the direct-current electric power to the constant voltage circuit 27 and the power-on reset circuit 28. The constant voltage circuit 27 produces, from the direct-current electric power fed thereto, constant voltages necessary for the operation of the individual circuit blocks, and feeds those constant voltages to the individual circuit blocks including the internal logic circuit 21. The power-on reset circuit 28, according to the direct-current electric power fed thereto, produces a reset signal for initializing the internal logic circuit 21, and feeds the reset signal to the internal logic circuit 21.

Figure 2:
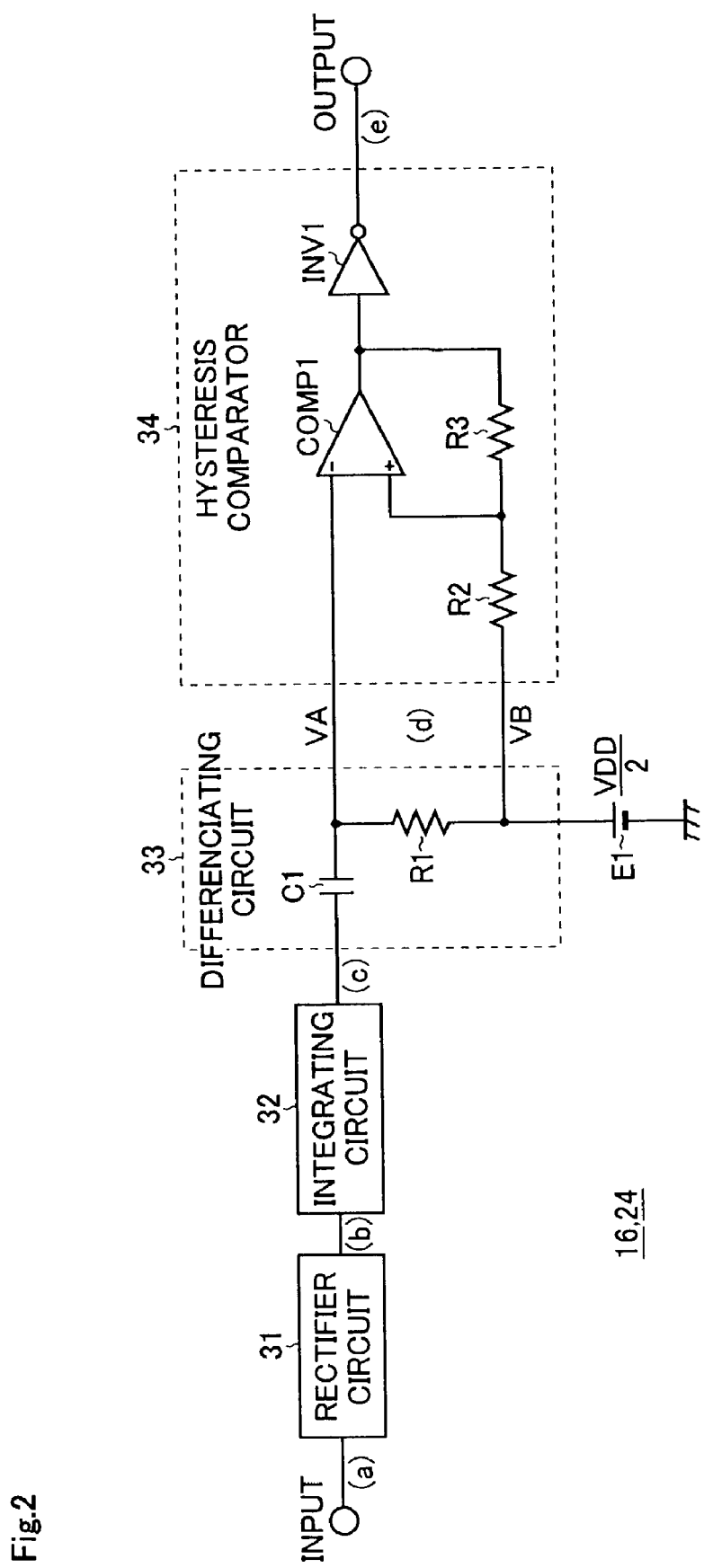
FIG. 2 is a circuit diagram of an example of the demodulator circuits 16 and 24.
Figure 4A:
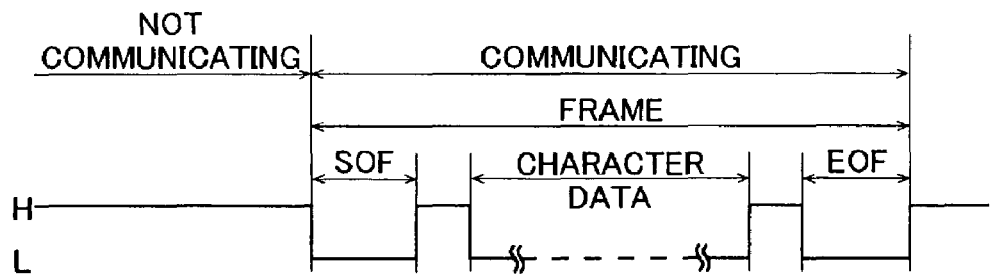
FIGS. 4A and 4B are waveform diagrams illustrating the data communication format complying with the ISO/IEC14443 standard.
Figure 4B:
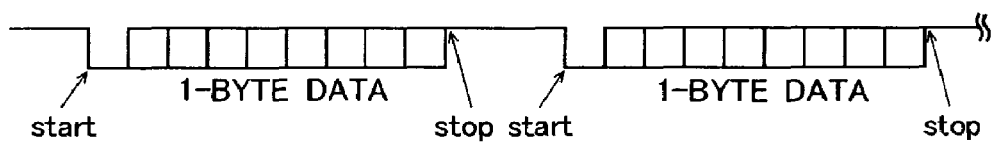

Next, the internal configuration and the demodulation operation of the demodulator circuits 16 and 24 provided in the reader/writer apparatus 1 and the IC card 2, respectively, will be described. FIG. 2 is a circuit diagram of an example of the demodulator circuits 16 and 24. In this embodiment, the demodulator circuits 16 and 24 each include a rectifier circuit 31, an integrating circuit 32, a differentiating circuit 33, and a hysteresis comparator circuit 34.

The rectifier circuit 31 subjects the modulated wave (a) fed thereto to full-wave rectification to produce a rectified wave (b). The integrating circuit 32 integrates the rectified wave (b) to remove the carrier wave component therefrom and thereby produce an envelope wave (c) that describe the envelope of the rectified wave (b).

The differentiating circuit 33 is a first-order high-pass filter composed of a capacitor C1 and a resistor R1, and outputs, to the hysteresis comparator circuit 34, the terminal voltages VA and VB of the resistor R1 as a differentiated wave (d) that represents an extract of variations occurring in the envelope wave (c). In the differentiating circuit 33 of this embodiment, one end of the resistor R1 is connected to the positive terminal of a direct-current voltage source E1, and the terminal voltage VB is kept constant at VDD/2.

The hysteresis comparator circuit 34 is composed of a comparator COMP1, an inverter INV1, and resistors R2 and R3. The hysteresis comparator circuit 34 produces a demodulated wave (e) according to the result of comparison of the terminal voltage VA of the resistor R1 included in the differentiating circuit 33 with threshold voltages Vth1 and Vth2 (VDD/2±ΔV).

When the envelope wave (c) falls, the terminal voltage VA so varies as to be lower than the terminal voltage VB. If this variation is greater than the hysteresis width ΔV, and the terminal voltage VA becomes lower than the threshold voltage Vth2, the hysteresis comparator circuit 34 turns the logic state of the demodulated wave (e) from "H" to "L." On the other hand, when the envelope wave (c) rises, the terminal voltage VA so varies as to be higher than the terminal voltage VB. If this variation is greater than the hysteresis width ΔV, and the terminal voltage VA becomes higher than the threshold voltage Vth1, the hysteresis comparator circuit 34 turns the logic state of the demodulated wave (e) from "L" to "H."

In this way, by configuring the demodulator circuits 16 and 24 to produce the demodulated wave (e) by detecting rises and falls in the envelope wave (c), it is possible to perform correct signal demodulation even when the communication data is kept at a logic "H" or "L" for a long period of time.

As mentioned earlier, the non-contact-type IC card system of this embodiment uses the data communication format complying with the ISO/IEC14443 standard. Therefore, so long as the demodulated wave (e) is kept in a mark state (at a logic "H") when no communication is taking place, the receiver apparatus can recognize the start of communication by detecting a transition of the demodulated wave (e) from a mark state (a logic "H") to a fall due to an SOF (a logic "L").

In addition, in the non-contact-type IC card system of this embodiment, to enable correct data communication without erroneous detection of an SOF even if the demodulated wave (e) is not kept in a mark state (at a logic "H") when no communication is taking place, the following improvements are made in the data communication format complying with the ISO/IEC14443 standard.

FIGS. 3A to 3E are waveform diagrams illustrating how erroneous detection of an SOF is avoided. In these figures, the waveforms (a) to (e) are those of the signals (a) to (e), respectively, observed in the demodulator circuits 16 and 24 shown in FIG. 2.

If, as indicated by solid lines in the figures, ringing noise or the like is superimposed on the modulated wave (a) when no communication is taking place, a distortion appears in the rectified wave (b) and in the envelope wave (c), and thus an unintended noise pulse appears in the differentiated wave (d). At this point, if the lower peak of the noise pulse reaches below the threshold level Vth2 and in addition its upper peak does not reach above the threshold level Vth1, an unintended transition from a mark state (a logic "H") to a logic "L" occurs in the demodulated wave (e), which is thereafter kept in the latter logic state even after the disappearance of the noise pulse.

To avoid this, in the non-contact-type IC card system of this embodiment, the transmitter apparatus, before reducing the amplitude of the modulated wave (a) to signal an SOF, reduces the amplitude of the modulated wave (a) temporarily and then restores it to its original level so that the demodulated wave (e) in the receiver apparatus is brought into a mark state (a logic "H"), in which it should be kept when no communication is taking place. In other words, before starting data communication, the transmitter apparatus transmits a predetermined dummy pulse to the receiver apparatus.

When a fall due to the dummy pulse occurs before a fall due to an SOF, the lower peak of the differentiated wave (d) reaches below the threshold voltage Vth2, and thus the demodulated wave (e) turns to a logic "L." In the case indicated by solid lines in the figures (in the state of malfunctioning), however, before the insertion of the dummy pulse, the demodulated wave (e) has already turned to a logic "L" as a result of ringing noise or the like being superimposed thereon, and therefore the insertion of the dummy pulse causes no change in logic.

Thereafter, when a rise occurs to recover from the fall due to the above-mentioned dummy pulse, the upper peak of the differentiated wave (d) reaches above the threshold voltage Vth1, and thus the demodulated wave (e) turns to a logic "H." That is, before a fall due to an SOF, the demodulated wave (e) is brought back into a mark state (a logic "H"), in which it should be kept when no communication is taking place.

With this configuration, even if the demodulated wave (e) is not kept in a mark state (at a logic "H") when no communication is taking place, the malfunctioning state is cleared before a fall due to an SOF. This makes it possible to perform correct data communication without erroneous detection of an SOF. Needless to say, if, as indicated by broken lines in the figures, the demodulated wave (e) is properly kept in a mark state (at a logic "H") when no communication is taking place, the demodulated wave (e) turns to a logic "L" on the failing edge of the dummy pulse and soon turns back to a mark state (a logic "H"). Thus, in this case also, it is possible to perform correct data communication without erroneous detection of an SOF.

It is advisable to set the degree of the above-described temporary reduction of the amplitude of the modulated wave (a) equal to the degree in which the amplitude is reduced during normal modulation, namely about 90% of the original amplitude in the unmodulated state. A dummy pulse like this, having the same amplitude reduction width as communication data, helps maintain a necessary and sufficient amplitude, i.e., intensity, to enable recovery to a mark state (a logic "H"), in which the communication data should be kept when no communication is taking place, and also helps prevent malfunctioning due to the insertion of the dummy pulse.

In the non-contact-type IC card system of this embodiment, while the low state due to an SOF or EOF lasts for a period of 10 to 11 etu, the period for which the amplitude of the modulated wave (a) is temporarily reduced (i.e., the period of the low state due to a dummy pulse) is set equal to a few etu (in this embodiment, 1 etc, which is comparatively easy to produce from a circuit design perspective). This configuration prevents the inserted dummy pulse from being erroneously detected as an SOF. It is to be noted that a period of 1 etu equals the period required to transmit one-bit data; specifically, where communication is performed with a carrier frequency of 13.56 MHz, 1 etu equals about 9.43 μsec.

Moreover, in the non-contact-type IC card system of this embodiment, the period for which the modulated wave (a) is kept unmodulated after its amplitude has been temporarily reduced (i.e., the period of the high state due to the same dummy pulse) is also set equal to 1 etu. By making the unmodulated period before a fall due to an SOF short in this way, it is possible to reduce the possibility of ringing noise or the like being superimposed again before a fall due to an SOF and thus the possibility of the modulated wave (a) turning from a mark state (a logic "H"), in which it should be kept when no communicating is taking place, to a logic "L". In this embodiment, the above-mentioned unmodulated period is set equal to 1 etu, which is comparatively easy to produce from a circuit design perspective; however, the unmodulated period may be set shorter to further reduce the possibility of superimposition of ringing noise or the like.

As described above, with a non-contact-type IC card system embodying the invention, it is possible to achieve high-quality data communication even in applications where strict requirements are posed on data communication, as where "holding-over" or "touch-and-go" operation is involved. This makes such a communication system usable in a variety of applications.

The embodiment described above deals with a case where the present invention is applied to a non-contact-type IC card system. However, it is to be understood that the present invention finds wide application in communication systems of any other types.

What is claimed is:

1. A transmitter apparatus comprising:
   a modulator for modulating a carrier wave to produce a modulated wave having communication data superimposed thereon; and
   a transmitter for transmitting the modulated wave to a receiver apparatus,
   wherein the communication data is capable of being communicated on a frame-by-frame basis, each frame including a start of frame indicator indicating a head of the frame, character data conforming to a character transmission protocol, and an end of frame indicator indicating a tail of the frame, and
   before starting transmission of the communication data, the modulator superimposes a dummy pulse on the carrier wave, the dummy pulse bringing a logic state of a demodulated wave demodulated in the receiver apparatus into a logic state that is different from the start of frame indicator and in which the demodulated wave is kept when no communication is taking place.

2. A transmitter apparatus as claimed in claim 1, wherein the modulator is a circuit that produces the modulated wave having the communication data superimposed thereon by amplitude-modulating the carrier wave, and before reducing an amplitude of the modulated wave to mark the start of frame, reduces the amplitude of the modulated wave temporarily from an original level thereof and then restores the amplitude of the modulated wave to the original level.

3. A transmitter apparatus as claimed in claim 2,
   wherein a degree in which the amplitude of the modulated wave is reduced temporarily is equal to a degree in which the amplitude of the modulated wave is reduced during normal modulation.

4. A transmitter apparatus as claimed in claim 2,
   wherein, immediately after the amplitude of the modulated wave is reduced temporarily, the modulated wave is kept unmodulated for a period equal to or shorter than a period required to transmit one-bit data.

5. A communication system comprising:
   a transmitter apparatus as claimed in claim 2; and
   a receiver apparatus that demodulates the received modulated wave and, by detecting the logic transition of the resulting demodulated wave from the logic state that is different from the start of frame indicator and in which the demodulated wave is kept when no communication is taking place to a logic state corresponding to the start of frame indicator, detects the start of frame indicator and thereby recognizes a start of communication with the transmitter apparatus.

6. A communication system as claimed in claim 5,
   wherein the transmitter apparatus and the receiver apparatus are a non-contact-type IC card and a reader/writer apparatus that performs data communication with the IC card.

* * * * *